US012738511B2

(12) United States Patent
Kim et al.

(10) Patent No.: US 12,738,511 B2
(45) Date of Patent: Sep. 15, 2026

(54) FUEL CELL MEMBRANE HUMIDIFIER

(71) Applicant: KOLON INDUSTRIES, INC., Seoul (KR)

(72) Inventors: Do Woo Kim, Seoul (KR); Na Hyun Ahn, Seoul (KR); In Ho Kim, Seoul (KR)

(73) Assignee: KOLON INDUSTRIES, INC., Seoul (KR)

(*) Notice: Subject to any disclaimer, the term of this patent is extended or adjusted under 35 U.S.C. 154(b) by 406 days.

(21) Appl. No.: 18/578,189

(22) PCT Filed: Jul. 8, 2022

(86) PCT No.: PCT/KR2022/009969
§ 371 (c)(1),
(2) Date: Jan. 10, 2024

(87) PCT Pub. No.: WO2023/033343
PCT Pub. Date: Mar. 9, 2023

(65) Prior Publication Data

US 2024/0322196 A1 Sep. 26, 2024

(30) Foreign Application Priority Data

Aug. 31, 2021 (KR) ........................ 10-2021-0115979

(51) Int. Cl.
*H01M 8/04119* (2016.01)
*B01D 63/04* (2006.01)

(52) U.S. Cl.
CPC ........ *H01M 8/04126* (2013.01); *B01D 63/04* (2013.01); *B01D 2313/083* (2013.01); (Continued)

(58) Field of Classification Search
CPC ........ H01M 8/04126; H01M 8/041149; B01D 63/04; Y02E 60/50
See application file for complete search history.

(56) References Cited

U.S. PATENT DOCUMENTS 7,624,971 B2 12/2009 Terasaki
2008/0237902 A1 10/2008 Nagumo
(Continued)

FOREIGN PATENT DOCUMENTS

JP 2002-298895 A 10/2002
JP 2005-156039 A 6/2005
(Continued)

OTHER PUBLICATIONS

JP Decision to Grant a Patent dated Sep. 25, 2024.
(Continued)

*Primary Examiner* — Barbara L Gilliam
(74) *Attorney, Agent, or Firm* — Harvest IP Law, LLP

(57) ABSTRACT

Provided is a fuel cell membrane humidifier in which humidification efficiency is improved by preventing differential pressure loss in a humidification module. The fuel cell membrane humidifier performs moisture exchange between a first fluid and a second fluid and includes a mid-case, a second fluid inlet through which the second fluid is introduced into the mid-case, a second fluid outlet through which the second fluid is discharged to outside, a partition wall configured to divide an inner space of the mid-case into a first space and a second space, and at least one cartridge located in the mid-case and configured to accommodate a plurality of hollow fiber membranes therein. A cross-sectional area of the second fluid inlet is equal to or greater than a total area of windows constituting a first mesh hole unit and arranged in a mesh shape in the at least one cartridge for fluid communication with the first space.

9 Claims, 7 Drawing Sheets

(52) U.S. Cl.
CPC ...... *B01D 2313/18* (2013.01); *B01D 2313/19* (2013.01); *B01D 2313/201* (2022.08)

(56) References Cited

U.S. PATENT DOCUMENTS

| | | | | |
|---|---|---|---|---|
| 2021/0151780 | A1 | 5/2021 | Kim | |
| 2024/0339638 | A1 * | 10/2024 | Yang | H01M 8/04141 |

FOREIGN PATENT DOCUMENTS

| | | | |
|---|---|---|---|
| JP | 2007-046801 | A | 2/2007 |
| JP | 2007-147139 | A | 6/2007 |
| JP | 2008-238068 | A | 10/2008 |
| KR | 10-2014-0038223 | A | 3/2014 |
| KR | 10-2014-0038687 | A | 3/2014 |
| KR | 2015-0078538 | A | 7/2015 |
| KR | 2019-0138288 | A | 12/2019 |
| KR | 10-2021-0011204 | A | 2/2021 |
| WO | 2019-235676 | A1 | 12/2019 |
| WO | 2020-138852 | A1 | 7/2020 |

OTHER PUBLICATIONS

International Search Report dated Nov. 1, 2022.
KR Notice Of Allowance dated Jun. 12, 2025.
Office Action from Korean Patent Office, dated Oct. 28, 2024.
EESR dated May 6, 2025.

* cited by examiner

FUEL CELL MEMBRANE HUMIDIFIER

CROSS REFERENCE TO RELATED APPLICATION(S)

This application is a National Stage of International Application No. PCT/KR2022/009969 filed Jul. 8, 2022, claiming priority based on Korean Patent Application No. 10-2021-0115979 filed Aug. 31, 2021, the disclosure of which is incorporated herein by reference in its entirety.

TECHNICAL FIELD

The present disclosure relates to a fuel cell membrane humidifier, and more particularly, to a fuel cell membrane humidifier in which humidification efficiency is improved by preventing differential pressure loss in a humidification module.

BACKGROUND ART

Fuel cells refer to power-generating cells for producing electricity by combining hydrogen with oxygen. Unlike general chemical cells such as dry batteries or storage batteries, fuel cells may continuously produce electricity as long as hydrogen and oxygen are supplied, and are about twice as efficient as internal combustion engines because there is no heat loss.

Also, because chemical energy generated by a combination of hydrogen and oxygen is directly converted into electrical energy, the emission of pollutants is low. Accordingly, fuel cells are not only environmentally friendly, but also may reduce concerns about resource depletion due to increased energy consumption.

Fuel cells may be roughly classified, according to the type of electrolyte used, into a polymer electrolyte membrane fuel cell (PEMFC), a phosphoric acid fuel cell (PAFC), a molten carbonate fuel cell (MCFC), a solid oxide fuel cell (SOFC), and an alkaline fuel cell (AFC).

These fuel cells fundamentally operate according to the same principle, but are different in terms of the type of fuel used, operating temperature, catalyst, and electrolyte. Among them, the PEMFC is known to be the most promising not only for small-scale stationary power generation equipment but also for transportation systems because the PEMFC operates at a lower temperature than other fuel cells and may be miniaturized due to its high power density.

One of the most important factors in improving the performance of the PEMFC is to maintain a moisture content by supplying a certain amount of moisture or more to a polymer electrolyte membrane or a proton exchange membrane (PEM) of a membrane electrode assembly (MEA). This is because power generation efficiency is rapidly reduced when the polymer electrolyte membrane is dried.

Examples of a method of humidifying a polymer electrolyte membrane include 1) a bubbler humidification method of filling a pressure-resistant container with water and supplying moisture by allowing a target gas to pass through a diffuser, 2) a direct injection method of calculating the amount of moisture to be supplied that is required for fuel cell reaction and directly supplying moisture to a gas flow pipe through a solenoid valve, and 3) a humidification membrane method of supplying moisture to a gas fluidized bed by using a polymer separator.

Among the methods, the humidification membrane method of humidifying a polymer electrolyte membrane by providing vapor to air supplied to the polymer electrolyte membrane by using a membrane through which only vapor included in off-gas is selectively transmitted is advantageous in that the weight and size of a membrane humidifier may be reduced.

When a module is formed, a hollow fiber membrane having a large transmission area per unit volume is suitable for the selective transmission membrane used in the humidification membrane method. That is, when a membrane humidifier is manufactured by using a hollow fiber membrane, high integration of the hollow fiber membrane having a large contact surface area is possible, and thus, a fuel cell may be sufficiently humidified even with a small amount, an inexpensive material may be used, and moisture and heat included in off-gas discharged from the full cell at a high temperature may be collected and reused through the membrane humidifier.

DISCLOSURE

Technical Problem

An objective of the present disclosure is to provide a fuel cell membrane humidifier in which humidification efficiency is improved by preventing differential pressure loss in a humidification module.

Technical Solution

According to an embodiment of the present disclosure, a fuel cell membrane humidifier for performing moisture exchange between a first fluid and a second fluid includes a mid-case, a second fluid inlet through which the second fluid is introduced into the mid-case, a second fluid outlet through which the second fluid is discharged to outside, a partition wall configured to divide an inner space of the mid-case into a first space and a second space, and at least one cartridge located in the mid-case and configured to accommodate a plurality of hollow fiber membranes therein. A cross-sectional area of the second fluid inlet is equal to or greater than a total area of windows constituting a first mesh hole unit and arranged in a mesh shape in the at least one cartridge for fluid communication with the first space.

In the fuel cell membrane humidifier according to an embodiment of the present disclosure, the total area of the windows constituting the first mesh hole unit may be equal to or greater than an internal cross-sectional area of the at least one cartridge excluding a cross-sectional area occupied by the plurality of hollow fiber membranes accommodated in the at least one cartridge.

In the fuel cell membrane humidifier according to an embodiment of the present disclosure, when the cross-sectional area of the second fluid inlet is CS1, the total area of the windows constituting the first mesh hole unit is CS2, a cross-sectional area of the at least one cartridge is CS3, and a sum of cross-sectional areas of the plurality of hollow fiber membranes accommodated in the at least one cartridge is CS4, an inner diameter of the second fluid inlet may satisfy $CS1 \geq CS2 \geq CS3 - CS4$.

The fuel cell membrane humidifier according to an embodiment of the present disclosure may further include an active bypass unit configured to adjust a flow rate of the second fluid flowing through the first space and the second space according to a flow rate of the second fluid introduced through the second fluid inlet.

In the fuel cell membrane humidifier according to an embodiment of the present disclosure, the active bypass unit may include a bypass hole passing through the partition wall, and a bypass hole opening/closing means configured to open/close the bypass hole according to a flow rate of the second fluid introduced through the second fluid inlet.

In the fuel cell membrane humidifier according to an embodiment of the present disclosure, the bypass hole opening/closing means may be a single valve member formed on the partition wall to cover the bypass hole.

In the fuel cell membrane humidifier according to an embodiment of the present disclosure, the bypass hole opening/closing means may be a dual valve member formed on the partition wall to cover both sides of the bypass hole.

In the fuel cell membrane humidifier according to an embodiment of the present disclosure, the bypass hole opening/closing means may be a double valve member formed on the partition wall to cover both sides of the bypass hole and formed so that at least part of the members overlap.

In the fuel cell membrane humidifier according to an embodiment of the present disclosure, the bypass hole opening/closing means may be formed of a flexible material that is deformed when pressure increases and returns to its original shape when pressure decreases.

Other details of the embodiments according to various aspects of the present disclosure are included in the following detailed description.

Advantageous Effects

According to an embodiment of the present disclosure, humidification efficiency may be improved by preventing differential pressure loss in a humidification module.

MODE FOR INVENTION

As the present disclosure allows for various changes and numerous embodiments, certain embodiments will be illustrated and described in the detailed description. However, this is not intended to limit the present disclosure to particular modes of practice, and it is to be appreciated that all changes, equivalents, and substitutes that do not depart from the spirit and technical scope of the present disclosure are encompassed in the present disclosure.

The terms used in the present disclosure are merely used to describe specific embodiments, and are not intended to limit the present disclosure. The singular forms "a," "an," and "the" are intended to include the plural forms as well, unless the context clearly indicates otherwise. Further, as used in this present disclosure, the terms "include," "have" and their conjugates may be construed to denote a certain feature, number, step, operation, constituent element, component, or a combination thereof, but may not be construed to exclude the existence or addition of one or more other features, numbers, steps, operations, constituent elements, components, or combinations thereof. Hereinafter, a fuel cell membrane humidifier according to an embodiment of the present disclosure will be described with reference to the drawings.

Figure 1:
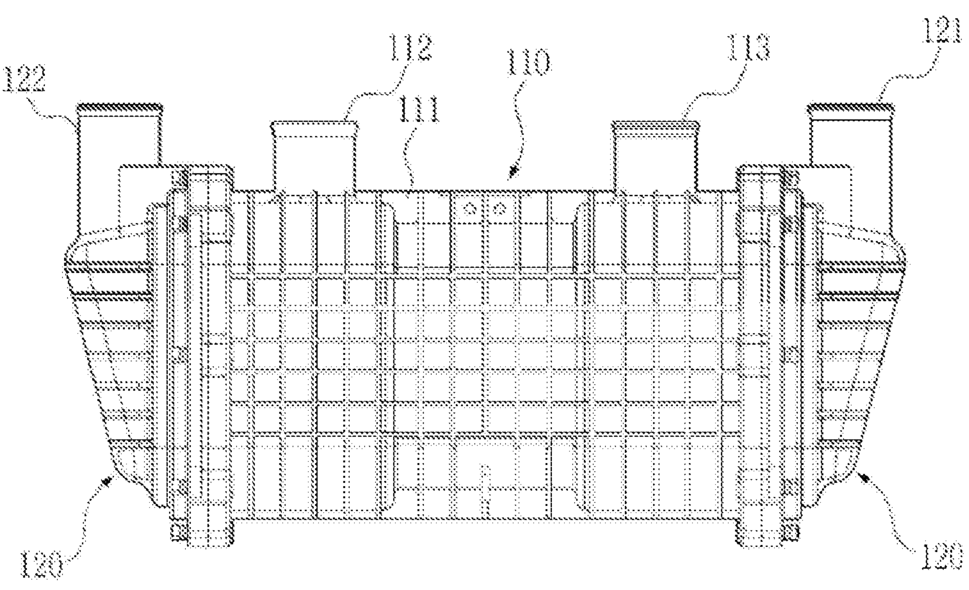
FIG. 1 is a front view illustrating a fuel cell membrane humidifier, according to embodiments of the present disclosure.
Figure 2:
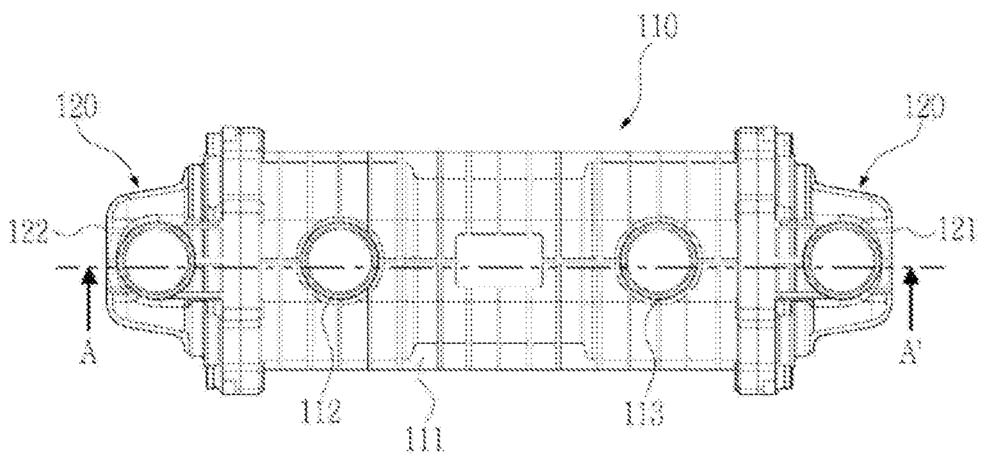
FIG. 2 is a plan view illustrating a fuel cell membrane humidifier, according to embodiments of the present disclosure.
Figure 3:
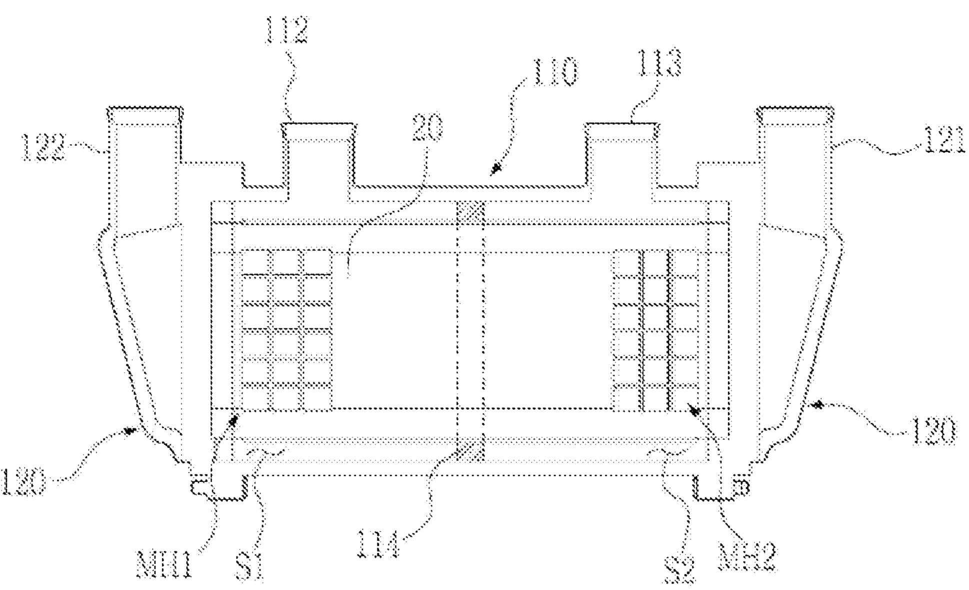
FIG. 3 is a cross-sectional view taken along line A-A' of FIG. 2, according to an embodiment.
Figure 4:
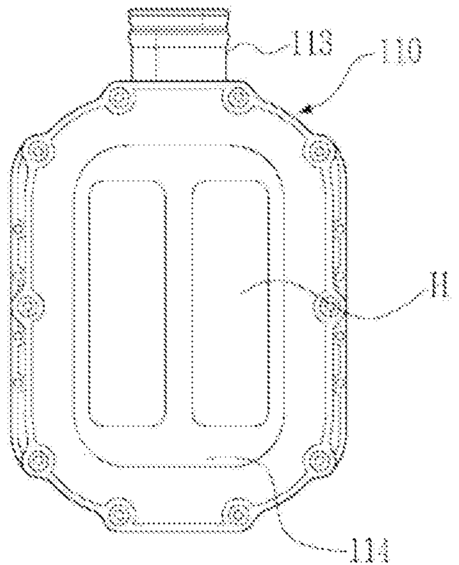
FIG. 4 is a side view illustrating a humidification module from which a cap of the fuel cell membrane humidifier of FIG. 3 is removed.
Figure 5:
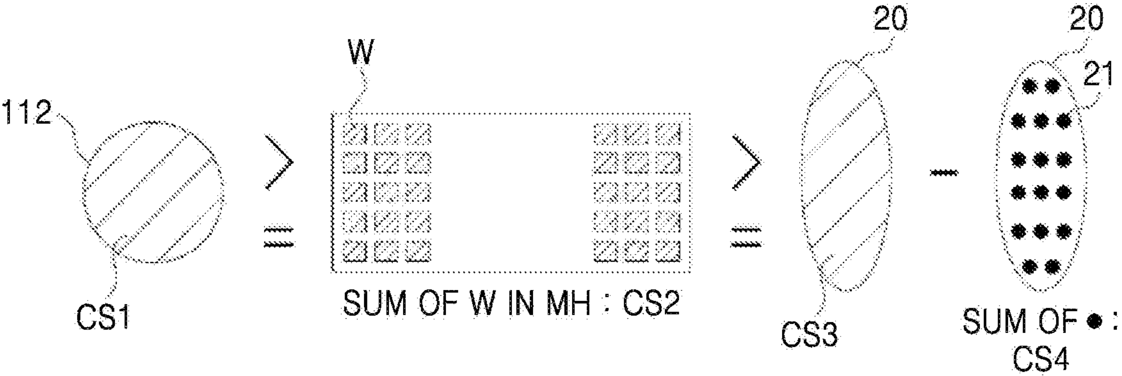
FIG. 5 is a conceptual view illustrating a relationship between a cross-sectional area of a second fluid inlet, a total area of cartridge windows, a cross-sectional area of a cartridge, and a sum of cross-sectional areas of hollow fiber membranes.

FIG. 1 is a front view illustrating a fuel cell membrane humidifier, according to embodiments of the present disclosure. FIG. 2 is a plan view illustrating a fuel cell membrane humidifier, according to embodiments of the present disclosure. FIG. 3 is a cross-sectional view taken along line A-A' of FIG. 2, according to an embodiment. FIG. 4 is a side view illustrating a humidification module from which a cap of the fuel cell membrane humidifier of FIG. 3 is removed. FIG. 5 is a conceptual view illustrating a relationship between a cross-sectional area of a second fluid inlet, a total area of cartridge windows, a cross-sectional area of a cartridge, and a sum of cross-sectional areas of hollow fiber membranes.

As shown in FIGS. 1 to 4, a fuel cell membrane humidifier according to an embodiment of the present disclosure includes a humidification module 110 and caps 120.

The humidification module 110 performs moisture exchange between a first fluid supplied from the outside and a second fluid discharged from a fuel cell stack (not shown). The caps 120 are fastened to both ends of the humidification module 110. A first fluid inlet 121 through which the first fluid supplied from the outside is supplied to the humidification module 110 is formed in one of the caps 120, and a first fluid outlet 122 through which the first fluid humidified by the humidification module 110 is supplied to the fuel cell stack is formed in the other of the caps 120.

The humidification module 110 includes a mid-case 111 including a second fluid inlet 112 and a second fluid outlet 113, and at least one cartridge 20 located in the mid-case 111. The second fluid discharged from the fuel cell stack (not shown) is introduced into the second fluid inlet 112 and subjected to moisture exchange in the humidification module 110, and then is discharged to the second fluid outlet 113.

In the present disclosure, a fluid introduced/discharged through the second fluid inlet 112 or the second fluid outlet 113 is not limited to the second fluid. Also, a fluid introduced/discharged through the first fluid inlet 121 or the first outlet 122 is not limited to the first fluid.

One of the caps 120 may be designed to supply the second fluid to the humidification module 110 to flow through a hollow fiber membrane, and the other of the caps 120 may be designed to discharge the second fluid subjected to moisture exchange to the outside. Also, in this case, the first fluid may be introduced through any one of the second fluid inlet 112 and the second fluid outlet 113, and the first fluid humidified by the humidification module 110 may be supplied to the fuel cell stack through the other of the second fluid inlet 112 and the second fluid outlet 113. A flow direction of the first fluid and a flow direction of the second fluid may be the same or opposite to each other.

Each of the mid-case 111 and the cap 120 may be independently formed of hard plastic or metal, and may have a circular or polygonal cross-sectional shape in a width direction. The circular shape includes an elliptical shape, and the polygonal shape includes a polygonal shape with rounded corners. Examples of the hard plastic may include polycarbonate, polyamide (PA), polyphthalamide (PPA), and polypropylene (PP).

An inner space of the mid-case 111 may be divided by a partition wall 114 into a first space S1 and a second space S2. The flow of the second fluid introduced through the second fluid inlet 112 is blocked by the partition wall 114 and is not immediately discharged to the second fluid outlet 113, but is subjected to moisture exchange while flowing through the cartridge 20 located in the mid-case 111 and then is discharged to the second fluid outlet 113. The partition wall 114 may have an insertion hole H into which at least one cartridge 20 may be inserted. The cartridge 20 will be described below with reference to FIGS. 11 and 12.

The second fluid discharged from the fuel cell stack (not shown) has a flow path of the second fluid inlet 112→the first space S1→cartridge windows W→an inner space of the cartridge 20→the second space S2→the second fluid outlet 113. In the inner space of the cartridge 20 of this flow path, the second fluid is subjected to moisture exchange with the first fluid flowing through hollow fiber membranes 21 to humidify the first fluid.

When a flow cross-sectional area in the flow path of the second fluid increases, a pressure drop (differential pressure loss) may occur, and the flow of the second fluid may slow down, thereby reducing humidification efficiency. In particular, when the flow of the second fluid slows down in the inner space of the cartridge 20, humidification efficiency may be reduced.

Accordingly, in embodiments of the present disclosure, a cross-sectional area of the second fluid inlet 112 is designed by considering a total area of the windows W. In detail, a cross-sectional area of the second fluid inlet 112 may be equal to or greater than a total area of the windows W constituting a first mesh hole unit MH1 arranged in a mesh shape in the cartridge 20 for fluid communication with the first space S1. That is, because a cross-sectional area CS1 of the second fluid inlet 112 is large and a total area CS2 of the windows W is small, a flow cross-sectional area of the second fluid may decrease, thereby preventing differential pressure loss due to a decrease in a speed of the second fluid.

Also, optionally, a total area of the windows W constituting the first mesh hole unit MH1 may be designed by considering both a cross-sectional area of the cartridge 20 and cross-sectional areas of a plurality of hollow fiber membranes 21 accommodated in the cartridge 20. In detail, it is preferable that a total area of the windows W constituting the first mesh hole unit MH1 is equal to or greater than an internal cross-sectional area of the cartridge excluding a cross-sectional area occupied by the hollow fiber membranes 21. That is, because the total area CS2 of the windows W is large and the internal cross-sectional area CS3-CS4 of the cartridge 20 is small, a flow cross-sectional area of the second fluid may decrease, thereby preventing differential pressure loss due to a decrease in a speed of the second fluid.

As shown in FIG. 5, it is preferable that, when a cross-sectional area of the second fluid inlet 112 is CS1, a total area of windows constituting a first mesh hole unit is CS2, a cross-sectional area of a cartridge is CS3, and a sum of cross-sectional areas of a plurality of hollow fiber membranes accommodated in the cartridge is CS4, an inner diameter of the second fluid inlet 112 satisfies CS1≥CS2≥CS3−CS4.

Figure 6:
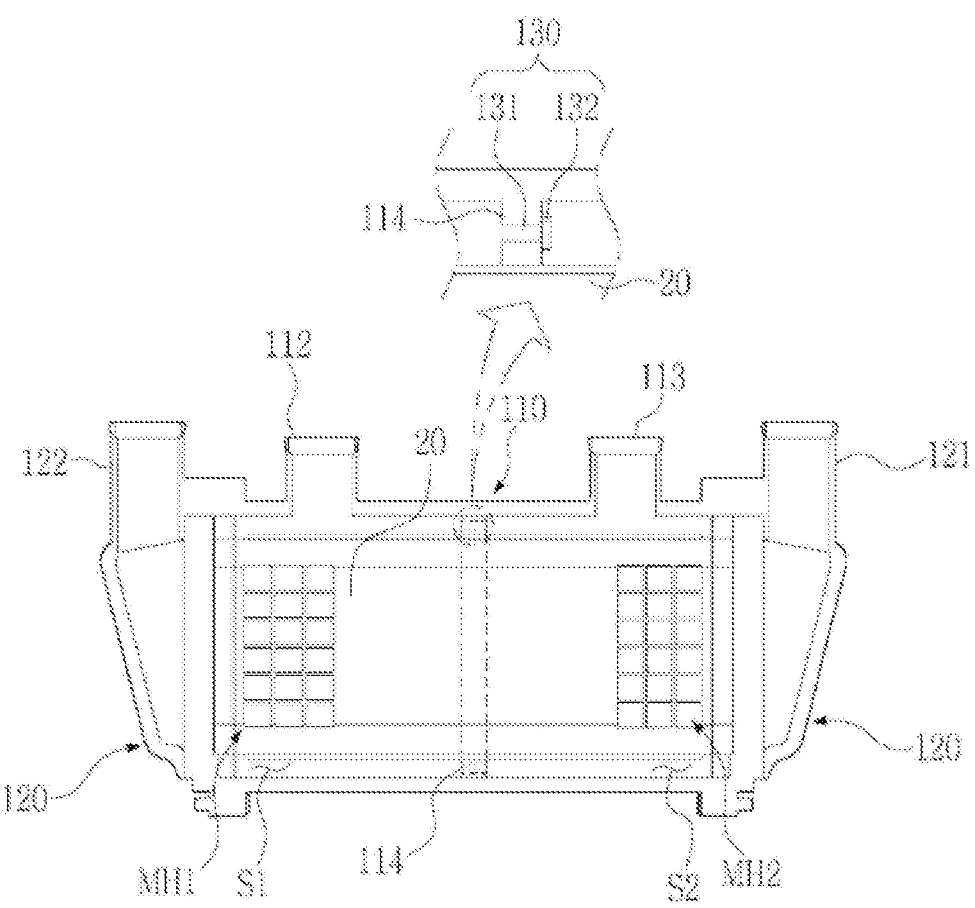
FIG. 6 is a cross-sectional view taken along line A-A' of FIG. 2, according to another embodiment.
Figure 7:
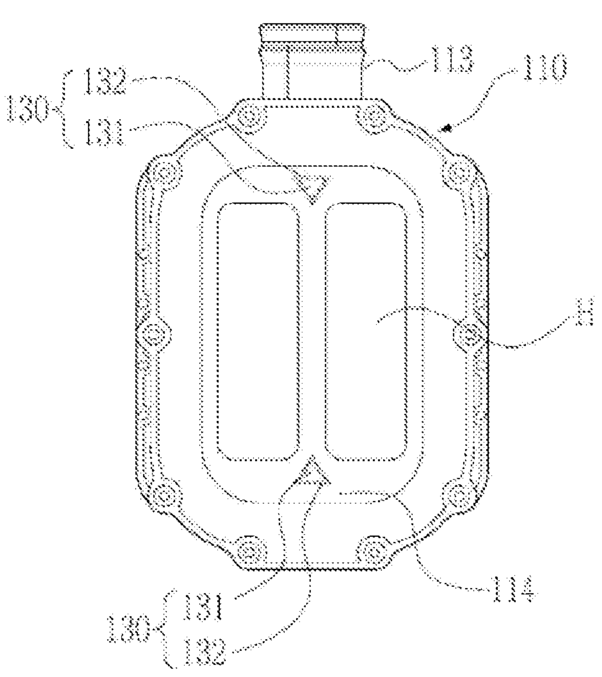
FIG. 7 is a side view illustrating a humidification module from which a cap of the fuel cell membrane humidifier of FIG. 6 is removed.

FIG. 6 is a cross-sectional view taken along line A-A' of FIG. 2, according to another embodiment. FIG. 7 is a side view illustrating a humidification module from which a cap of the fuel cell membrane humidifier of FIG. 6 is removed.

Referring to FIGS. 6 and 7, a fuel cell membrane humidifier according to another embodiment of the present disclosure includes the humidification module 110, the caps 120, and an active bypass unit 130. The humidification module 110 and the caps 120 are substantially the same as those described in the above embodiment, and thus a repeated description will be omitted.

The active bypass unit 130 adjusts a flow rate of the second fluid flowing through the first space S1 and the second space S2 according to a flow rate of the second fluid introduced through the second fluid inlet 112. The active bypass unit 130 includes a bypass hole 131 and a bypass hole opening/closing means 132.

The bypass hole 131 passes through the partition wall 114. The bypass hole 131 may be formed in any of various polygonal or circular shapes such as a triangular shape, a quadrangular shape, a circular shape, or an elliptical shape.

The bypass hole opening/closing means 132 may be formed of a flexible material that is deformed when pressure increases and returns to its original shape when pressure decreases. For example, the bypass hole opening/closing means 132 may include an elastic valve formed of an elastic material (e.g., rubber).

The bypass hole opening/closing means 132 including the elastic valve opens/closes the bypass hole 131 according to a flow rate of the second fluid introduced through the second fluid inlet 112.

When a flow rate of the second fluid increases, pressure increases according to the increased flow rate, and the elastic valve may be deformed in a pressure direction to at least partially open the bypass hole 131. When a flow rate of the second fluid decreases, pressure may decrease according to the decreased flow rate, and the elastic valve may return to its original shape to at least partially close the bypass hole 131.

Figure 8:
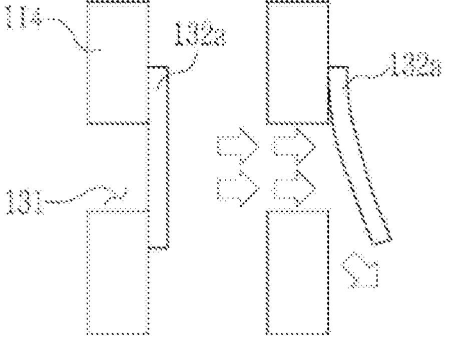
FIGS. 8 to 10 are views illustrating an active bypass unit, according to various embodiments.
Figure 9:
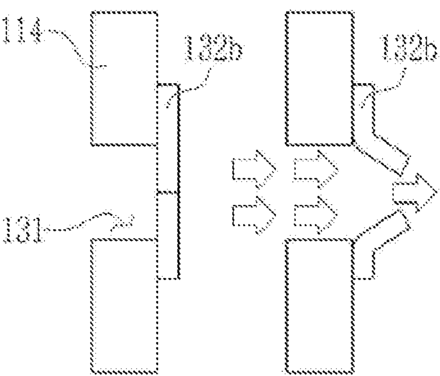
Figure 10:
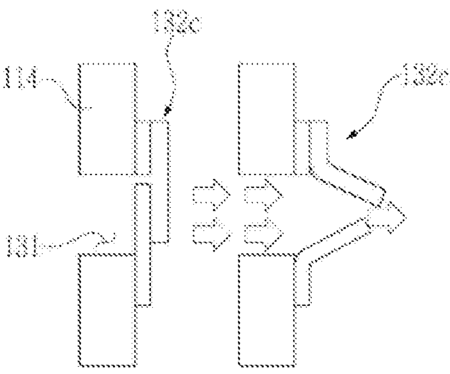

FIGS. 8 to 10 are views illustrating an active bypass unit, according to various embodiments.

As shown in FIG. 8, the active bypass unit 130 may include the bypass hole 131, and a single valve member **132*a* formed on the partition wall 114 to cover the bypass hole 131. Because the single valve member 132*a* only needs to be formed on one side around the bypass hole 131, a manufacturing process is simple. This may be the most basic type of active bypass unit 130**.

As shown in FIG. 9, the active bypass unit 130 may include the bypass hole 131, and a dual valve member **132*b* formed on the partition wall 114 to cover both sides of the bypass hole 131. Because the dual valve member 132*b* is formed on both sides around the bypass hole 131, the dual valve member 132*b*** may more sensitively respond to a change in a flow rate of the second fluid. This may be a more advantageous type when the volume of the fuel cell membrane humidifier is less than that of a basic type.

As shown in FIG. 10, the active bypass unit 130 may include the bypass hole 131, and a double valve member **132*c* formed on the partition wall 114 to cover both sides of the bypass hole 131 and at least partially overlap formed so that at least part of the members overlap. Because the double valve member 132*c* at least partially overlaps, the double valve member 132***c* may more insensitively respond to a change in a flow rate of the second fluid. This may be a more advantageous type when the volume of the fuel cell membrane humidifier is greater than the basic type.

A part of the second fluid introduced into the second fluid inlet 112 may flow from the first space S1 to the second space S2 through the active bypass unit 130 according to a flow rate of the second fluid, and is discharged to the second fluid outlet 113. Because the second fluid flowing through the active bypass unit 130 does not contact the first fluid, moisture exchange is not performed.

When the volume of the full cell membrane humidifier decreases, differential pressure in the fuel cell membrane humidifier may abnormally increase due to the second fluid introduced from the fuel cell stack. As such, because the abnormally increased differential pressure may adversely affect the efficiency of the fuel cell membrane humidifier, it is necessary to appropriately relieve the differential pressure. Because the active bypass unit 130 causes a part of the introduced second fluid to bypass the hollow fiber membrane and be discharged to the outside according to a flow rate of the second fluid, the abnormally increased differential pressure may be relieved.

Accordingly, the fuel cell membrane humidifier including the active bypass unit 130 according to embodiments of the present disclosure is more advantageous in reducing the volume.

Figure 11:
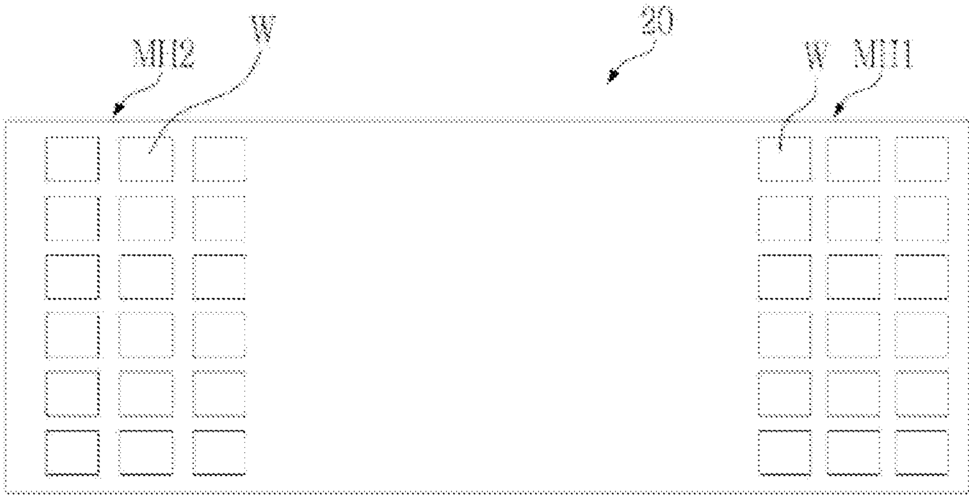
FIG. 11 is a perspective view illustrating a cartridge mounted on a fuel cell membrane humidifier, according to embodiments of the present disclosure.
Figure 12:
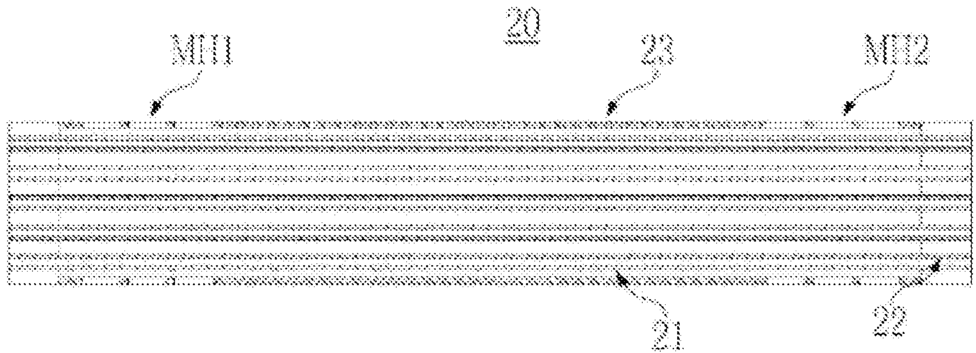
FIG. 12 is a cross-sectional view illustrating a cartridge mounted on a fuel cell membrane humidifier, according to embodiments of the present disclosure.

FIG. 11 is a perspective view illustrating a cartridge mounted on a fuel cell membrane humidifier, according to embodiments of the present disclosure. FIG. 12 is a cross-sectional view illustrating a cartridge mounted on a fuel cell membrane humidifier, according to embodiments of the present disclosure.

Referring to FIGS. 11 and 12, the cartridge 20 includes a plurality of hollow fiber membranes 21, a potting unit 22, and an inner case 23.

The hollow fiber membranes 21 may include a polymer film formed of polysulfone resin, polyethersulfone resin, sulfonated polysulfone resin, polyvinylidene fluoride (PVDF) resin, polyacrylonitrile (PAN) resin, polyimide resin, polyamideimide resin, polyesterimide resin, or a mixture of at least two of the above materials.

The potting unit 22 fixes ends of the hollow fiber membranes 21. The potting unit 22 may be formed by curing a liquid resin such as liquid polyurethane resin through a casting method such as deep potting or centrifugal potting.

The inner case 23 has an opening at each end, and the plurality of hollow fiber membranes 21 are accommodated in the inner case 23. The potting unit 22 in which ends of the hollow fiber membranes 21 are potted closes the opening of the inner case 23. The inner case 23 includes the first mesh hole unit MH1 arranged in a mesh shape for fluid communication with the first space S1 and a second mesh hole unit MH2 arranged in a mesh shape for fluid communication with the second space S2. Each of the first mesh hole unit MH1 and the second mesh hole unit MH2 includes a plurality of windows W.

The second fluid introduced into the first space S1 of the mid-case 111 through the second fluid inlet 112 flows into the inner case 23 through the first mesh hole unit MH1 and contacts outer surfaces of the hollow fiber membranes 21. Next, the second fluid subjected to moisture exchange with the first fluid escapes to the second space S2 through the second mesh hole unit MH2, and then is discharged from the mid-case 111 through the second fluid outlet 113.

When a flow direction of the second fluid is opposite to a flow direction of the first fluid introduced into the first fluid inlet 121, the second fluid introduced into the second space S2 of the mid-case 111 through the second fluid outlet 113 flows into the inner case 23 through the second mesh hole unit MH2 and contacts outer surfaces of the hollow fiber membranes 21. Next, the second fluid subjected to moisture exchange with the first fluid escapes to the first space S1 through the first mesh hole unit MH1, and then is discharged from the mid-case 111 through the second fluid inlet 112.

A gasket (not shown) may be provided between the mid-case 111 and the cartridge 210. The gasket allows the cartridge 20 to be mounted on the humidification module 110 through mechanical assembly. Accordingly, when abnormality occurs in a specific portion of the humidification module 110 (e.g., the cartridge 20), the mid-case 111 and the gasket may be simply mechanically separated from the humidification module 110 and, then only the corresponding portion may be repaired or replaced.

Although the one or more embodiments of the present disclosure have been described, it will be understood by one of ordinary skill in the art that the present disclosure may be modified and changed in various ways by adding, changing, or removing constituent components without departing from the scope of the present disclosure described in the claims, and the modifications or changes fall within the scope of the present disclosure.

[Description of Reference Numerals]

| | |
|---|---|
| 110: humidification module | 111: mid-case |
| 112; second fluid inlet | 113: second fluid outlet |
| 114: partition wall | 120: cap |
| 130: active bypass unit | |
| 20: cartridge | 21: hollow fiber membrane |
| 22: potting unit | 23: inner case |
| MH1: first mesh hole unit | MH2: second mesh hole unit |
| W: window | |
| CS1: cross-sectional area of a second fluid inlet | CS2: total area of windows |
| CS3: cross-sectional area of a cartridge | |
| CS4: sum of cross-sectional areas of a plurality of hollow fiber membranes accommodated in the cartridge | |

The invention claimed is:

1. A fuel cell membrane humidifier for performing moisture exchange between a first fluid and a second fluid, the fuel cell membrane comprising:

a mid-case;

a second fluid inlet through which the second fluid is introduced into the mid-case;

a second fluid outlet through which the second fluid is discharged to outside;

a partition wall configured to divide an inner space of the mid-case into a first space and a second space; and at least one cartridge located in the mid-case and configured to accommodate a plurality of hollow fiber membranes therein, wherein a cross-sectional area of the second fluid inlet is equal to or greater than a total area of windows constituting a first mesh hole unit and arranged in a mesh shape in the at least one cartridge for fluid communication with the first space.

2. The fuel cell membrane humidifier of claim 1, wherein the total area of the windows constituting the first mesh hole unit is equal to or greater than an internal cross-sectional area of the at least one cartridge excluding a cross-sectional area occupied by the plurality of hollow fiber membranes accommodated in the at least one cartridge.

3. The fuel cell membrane humidifier of claim 1, wherein, when the cross-sectional area of the second fluid inlet is CS1, the total area of the windows constituting the first mesh hole unit is CS2, a cross-sectional area of the at least one cartridge is CS3, and a sum of cross-sectional areas of the plurality of hollow fiber membranes accommodated in the at least one cartridge is CS4, an inner diameter of the second fluid inlet satisfies CS1≥CS2≥CS3−CS4.

4. The fuel cell membrane humidifier of claim 1, further comprising an active bypass unit configured to adjust a flow rate of the second fluid flowing through the first space and the second space according to a flow rate of the second fluid introduced through the second fluid inlet.

5. The fuel cell membrane humidifier of claim 4, wherein the active bypass unit comprises:

a bypass hole passing through the partition wall; and a bypass hole opening/closing means configured to open/close the bypass hole according to a flow rate of the second fluid introduced through the second fluid inlet.

6. The fuel cell membrane humidifier of claim 5, wherein the bypass hole opening/closing means is a single valve member formed on the partition wall to cover the bypass hole.

7. The fuel cell membrane humidifier of claim 5, wherein the bypass hole opening/closing means is a dual valve member formed on the partition wall to cover both sides of the bypass hole.

8. The fuel cell membrane humidifier of claim 5, wherein the bypass hole opening/closing means is a double valve member formed on the partition wall to cover both sides of the bypass hole and formed so that at least part of the members overlap.

9. The fuel cell membrane humidifier of claim 5, wherein the bypass hole opening/closing means is formed of a flexible material that is deformed when pressure increases and returns to its original shape when pressure decreases.

* * * * *